United States Patent
Lee et al.

(10) Patent No.: US 11,871,378 B2
(45) Date of Patent: Jan. 9, 2024

(54) DEACTIVATION OF CONFIGURED GRANT AND INITIATION OF CONNECTION REQUEST UPON DETECTION OF SIDELINK FAILURE

(71) Applicant: LG ELECTRONICS INC., Seoul (KR)

(72) Inventors: Youngdae Lee, Seoul (KR); Taehun Kim, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 17/275,365

(22) PCT Filed: Oct. 31, 2019

(86) PCT No.: PCT/KR2019/014563
§ 371 (c)(1),
(2) Date: Mar. 11, 2021

(87) PCT Pub. No.: WO2020/091443
PCT Pub. Date: May 7, 2020

(65) Prior Publication Data
US 2022/0124678 A1    Apr. 21, 2022

Related U.S. Application Data
(60) Provisional application No. 62/754,556, filed on Nov. 1, 2018.

(51) Int. Cl.
*H04W 72/02* (2009.01)
*H04W 76/30* (2018.01)
(Continued)

(52) U.S. Cl.
CPC ....... *H04W 72/02* (2013.01); *H04W 72/1263* (2013.01); *H04W 72/23* (2023.01); *H04W 76/30* (2018.02); *H04W 92/18* (2013.01)

(58) Field of Classification Search
CPC ....... H04W 4/40; H04W 36/03; H04W 72/02; H04W 72/1263; H04W 72/23;
(Continued)

(56) References Cited

U.S. PATENT DOCUMENTS 10,111,170 B2 * 10/2018 Lee ................ H04W 52/0216
10,313,065 B2 *  6/2019 Lee ..................... H04L 1/1851
(Continued)

FOREIGN PATENT DOCUMENTS

CN    106304360 A  *  1/2017    ........... H04W 4/46
CN    108632743 A  * 10/2018    ........ H04W 28/0215
(Continued)

OTHER PUBLICATIONS

Ericsson, "RRC reconfiguration of SPS-Config," R2-1803537, 3GPP TSG-RAN WG2 RAN2#101, Athens, Greece, Feb. 16, 2018, see section 2.
(Continued)

*Primary Examiner* — Eric Nowlin
(74) *Attorney, Agent, or Firm* — BRYAN CAVE LEIGHTON PAISNER LLP

(57) ABSTRACT

A method and apparatus for deactivation of a configured grant and initiation of connection request upon detection of sidelink failure in a wireless communication system is provided. A first wireless device, which performs a sidelink transmission with a second wireless device based on a sidelink configured grant, detects a problem on the sidelink transmission, and deactivates the sidelink configured grant.

8 Claims, 16 Drawing Sheets

(51) Int. Cl.
*H04W 72/1263* (2023.01)
*H04W 72/23* (2023.01)
*H04W 92/18* (2009.01)

(58) Field of Classification Search
CPC ..... H04W 76/14; H04W 76/15; H04W 76/18; H04W 76/19; H04W 76/30; H04W 92/18
See application file for complete search history.

(56) References Cited

U.S. PATENT DOCUMENTS

| | | | | |
|---|---|---|---|---|
| 10,952,194 | B2* | 3/2021 | Sharma | H04W 76/27 |
| 10,980,036 | B2* | 4/2021 | Lu | H04W 74/006 |
| 11,419,025 | B2* | 8/2022 | Xu | H04W 76/30 |
| 11,452,088 | B2* | 9/2022 | Lee | H04W 72/56 |
| 11,503,481 | B2* | 11/2022 | Lee | H04W 76/11 |
| 11,528,743 | B2* | 12/2022 | Agiwal | H04W 72/569 |
| 11,558,773 | B2* | 1/2023 | Yi | H04W 28/0278 |
| 11,582,718 | B2* | 2/2023 | Yu | H04W 80/08 |
| 11,723,038 | B2* | 8/2023 | Yi | H04W 72/0453 370/329 |
| 2016/0135217 | A1* | 5/2016 | Lee | H04L 47/30 370/329 |
| 2017/0041818 | A1 | 2/2017 | Lee et al. | |
| 2017/0289908 | A1* | 10/2017 | Lee | H04W 52/0216 |
| 2018/0013521 | A1* | 1/2018 | Lee | H04L 1/1851 |
| 2018/0103460 | A1* | 4/2018 | Sharma | H04W 72/23 |
| 2019/0059094 | A1* | 2/2019 | Kaur | H04W 76/18 |
| 2019/0182644 | A1* | 6/2019 | Zheng | H04W 72/23 |
| 2019/0191442 | A1* | 6/2019 | Lu | H04W 36/26 |
| 2020/0252909 | A1* | 8/2020 | Yu | H04W 72/0446 |
| 2021/0144582 | A1* | 5/2021 | Yi | H04W 72/23 |
| 2021/0144606 | A1* | 5/2021 | Xu | H04W 76/14 |
| 2021/0153176 | A1* | 5/2021 | Lee | H04W 4/40 |
| 2021/0227517 | A1* | 7/2021 | Yi | H04W 72/02 |
| 2021/0329689 | A1* | 10/2021 | Agiwal | H04W 72/02 |
| 2022/0124678 | A1* | 4/2022 | Lee | H04W 72/23 |
| 2022/0217749 | A1* | 7/2022 | Yu | H04L 5/0094 |
| 2022/0312438 | A1* | 9/2022 | Yi | H04W 72/1263 |
| 2022/0346173 | A1* | 10/2022 | Park | H04W 76/18 |
| 2023/0145519 | A1* | 5/2023 | Yi | H04W 28/0278 370/329 |
| 2023/0262685 | A1* | 8/2023 | Panzner | H04W 72/1263 370/329 |

FOREIGN PATENT DOCUMENTS

| | | | | |
|---|---|---|---|---|
| CN | 108632743 | B | * 12/2020 | ........ H04W 28/0215 |
| CN | 115443726 | A | * 12/2022 | ............ H04W 72/02 |
| EP | 3709748 | A1 | * 9/2020 | ............ H04W 36/06 |
| EP | 3498028 | B1 | * 10/2020 | ............ H04W 36/06 |
| EP | 4027722 | A1 | * 7/2022 | ............ H04L 1/1671 |
| JP | 2017538373 | A | * 12/2017 | |
| JP | 2019531006 | A | * 10/2019 | |
| JP | 6828138 | B2 | * 2/2021 | ............ H04W 36/06 |
| KR | 1020180104663 | | 9/2018 | |
| KR | 20210137522 | A | * 11/2021 | |
| WO | WO-2015143170 | A1 | * 9/2015 | .......... H04W 52/383 |
| WO | WO-2016072590 | A1 | * 5/2016 | ............ H04W 28/02 |
| WO | WO-2016072591 | A1 | * 5/2016 | ............. H04L 47/30 |
| WO | WO-2016122162 | A1 | * 8/2016 | .......... H04L 1/1851 |
| WO | WO-2018023888 | A1 | * 2/2018 | .............. H04W 4/46 |
| WO | WO-2018066967 | A1 | * 4/2018 | ......... H04W 72/042 |
| WO | WO-2018172857 | A1 | * 9/2018 | ........ H04W 28/0215 |
| WO | WO-2020091443 | A1 | * 5/2020 | .............. H04W 4/40 |
| WO | WO-2021054746 | A1 | * 3/2021 | ............ H04W 72/02 |
| WO | WO-2021146683 | A1 | * 7/2021 | ........ H04W 72/1242 |
| WO | WO-2021215799 | A1 | * 10/2021 | ............ H04W 72/02 |

OTHER PUBLICATIONS

Samsung, "Discussion on ehancements of LTE Uu and NR Uu to control NR side link," R1-1810872, 3GPP TSG RAN WG1 #94bis, Chengdu, China, Sep. 29, 2018, see sections 1-2.
ZTE et al, "CR to 38.321 on configured UL grant for TDD mode," R2-1814040, 3GPP TSG-RAN WG2 Meeting #103bis, Chengdu, China, Sep. 27, 2018, see section 5.8.2.
Section 23.10 of 3GPP TS 36.300 V15.2.0, Jun. 2018.
Section 23.14 of 3GPP TS 36.300 V15.2.0, Jun. 2018.
Section 5.10.2 of 3GPP TS 36.331 V15.3.0, Jun. 2018.
Section 5 of 3GPP TR 38.885 V0.1.0, Oct. 2018.

* cited by examiner

DEACTIVATION OF CONFIGURED GRANT AND INITIATION OF CONNECTION REQUEST UPON DETECTION OF SIDELINK FAILURE

This application is the National Stage filing under 35 U.S.C. 371 of International Application No. PCT/KR2019/014563, filed on Oct. 31, 2019, which claims the benefit of U.S. Provisional Application No. 62/754,556 filed on Nov. 1, 2018, the contents of which are all hereby incorporated by reference herein in their entirety.

TECHNICAL FIELD

The present disclosure relates to deactivation of a configured grant and initiation of connection request upon detection of sidelink failure.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile Broadband (eMBB), massive Machine-Type Communications (mMTC), Ultra-Reliable and Low Latency Communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

For sidelink communication and/or V2X communication, the network may indirectly allocate sidelink grants to other UEs via one UE. It should be clearly defined when to deactivate configured sidelink grants.

In an aspect, a method for a first wireless device in a wireless communication system is provided. The method includes deactivating a sidelink configured grant upon detecting a problem on a sidelink transmission using the sidelink configured grant.

In another aspect, an apparatus for implementing the above method is provided.

The present disclosure can have various advantageous effects.

For example, sidelink communication can be performed efficiently.

For example, V2X communication can be performed efficiently.

For example, it can be clearly defined when to deactivate a configured grant for sidelink/V2X communication.

For example, a configured grant for sidelink/V2X communication can be handled efficiently when a problem on sidelink is detected.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
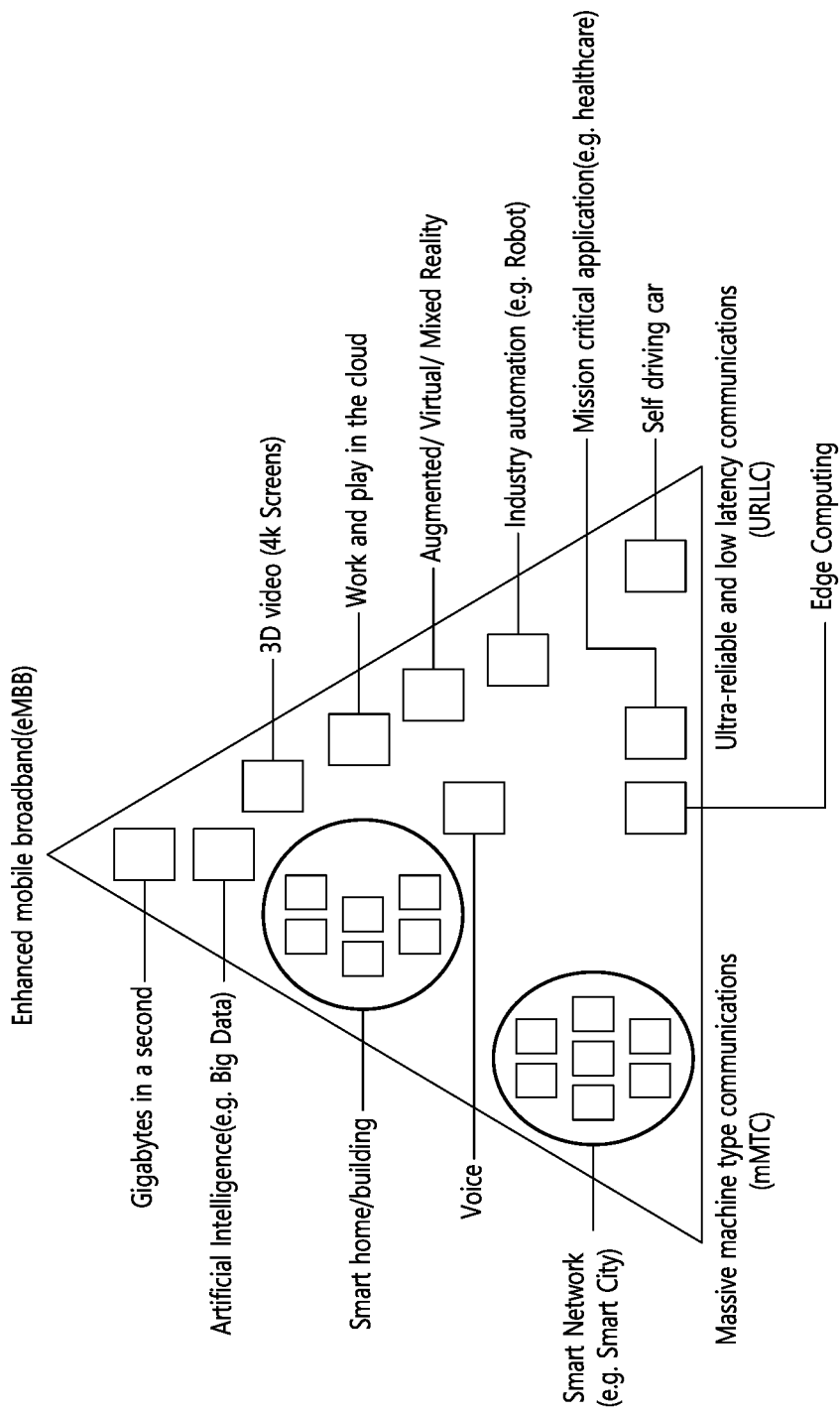
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
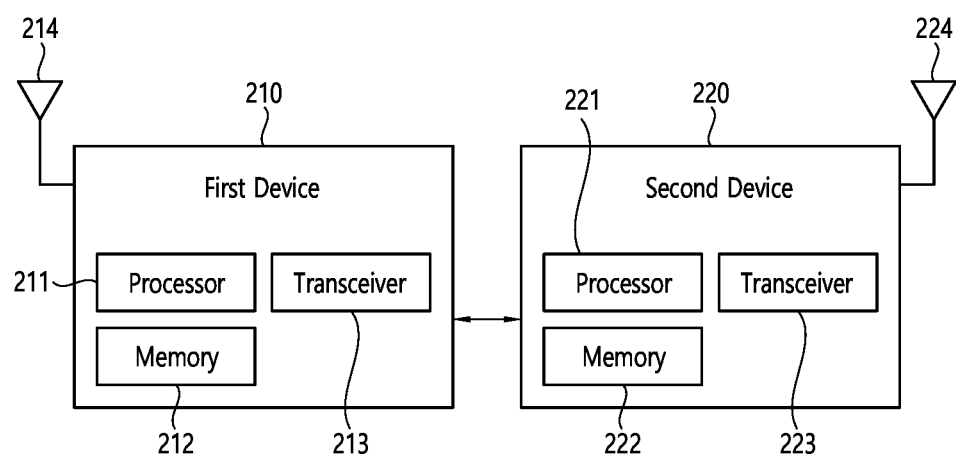
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
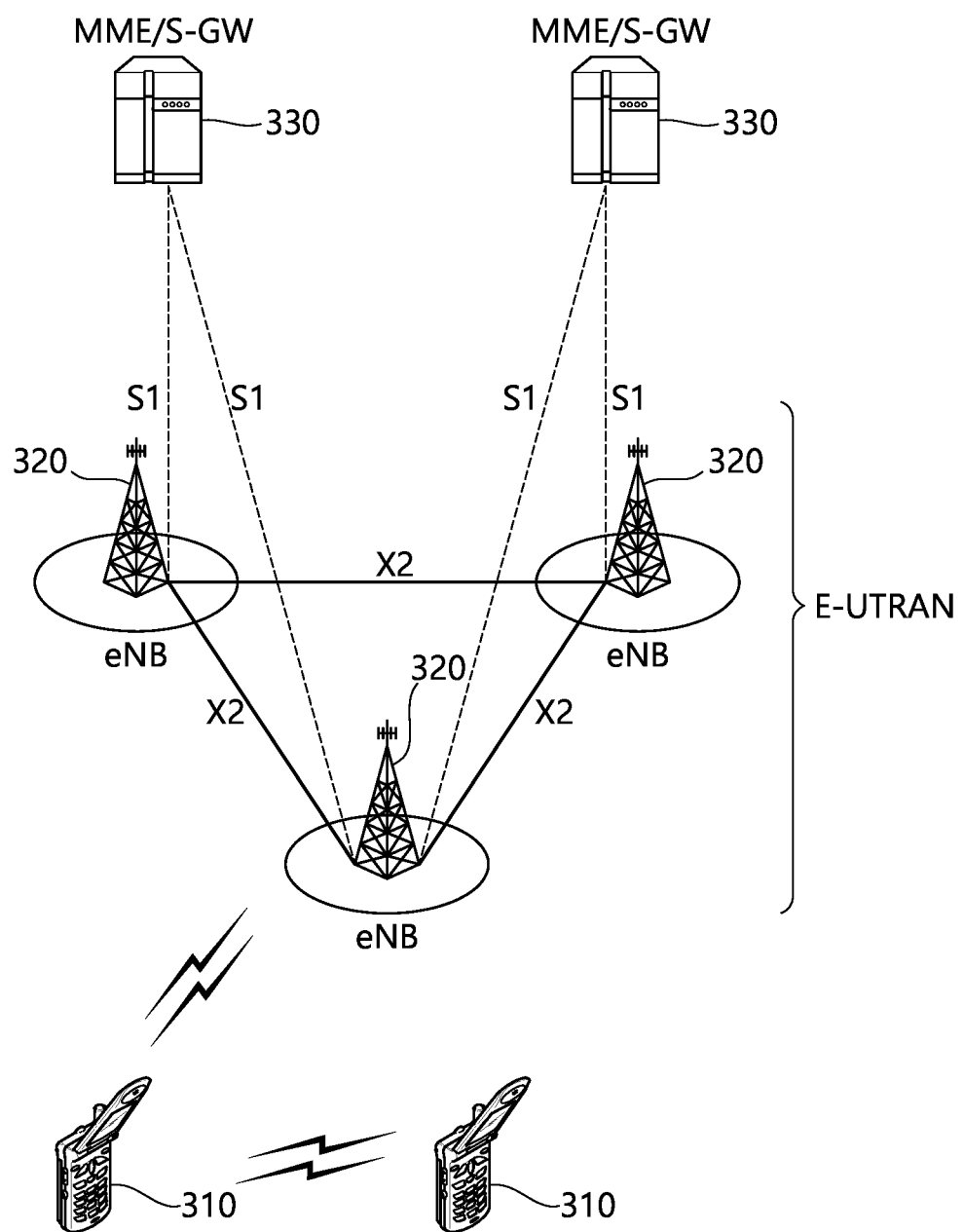
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNB s.

Figure 4:
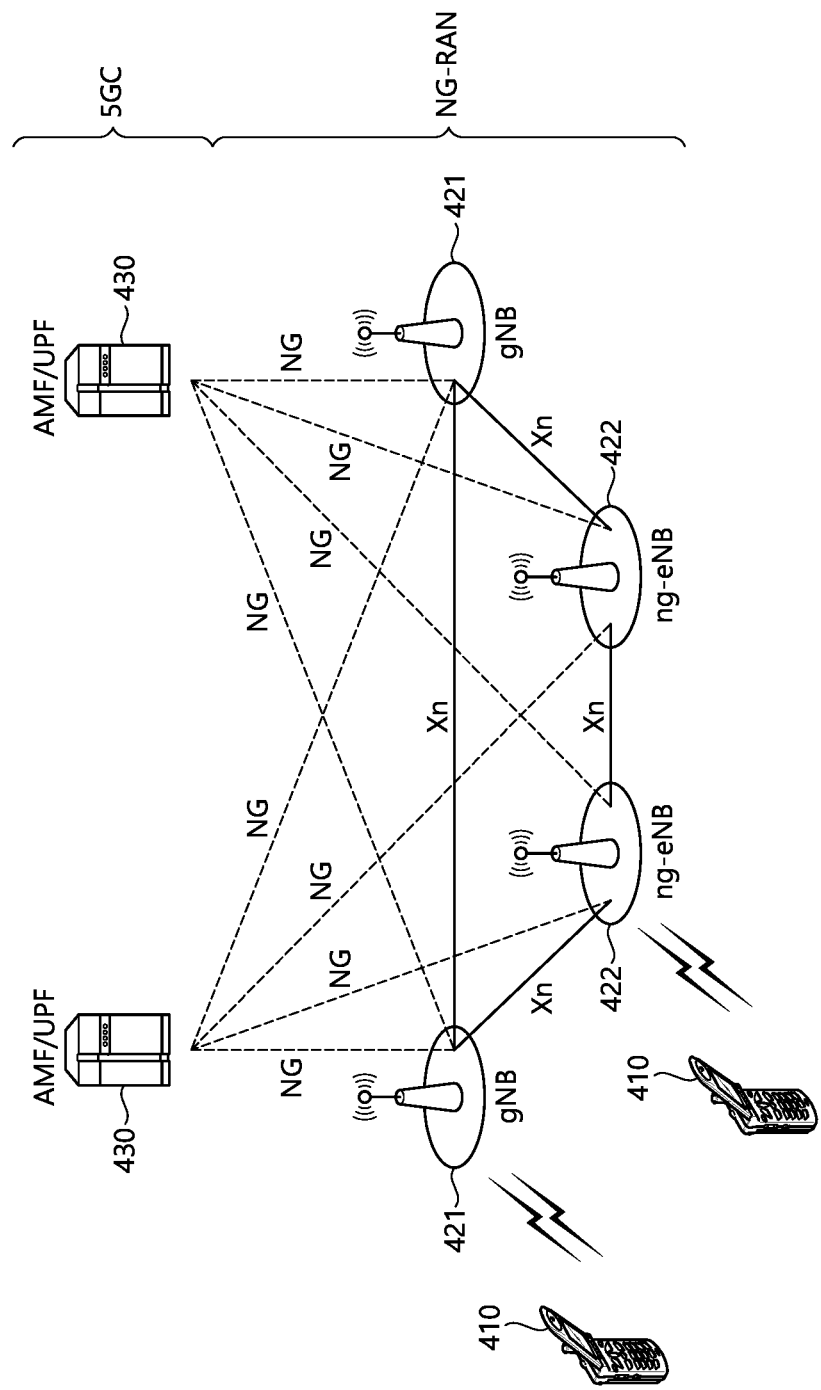
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

Figure 5:
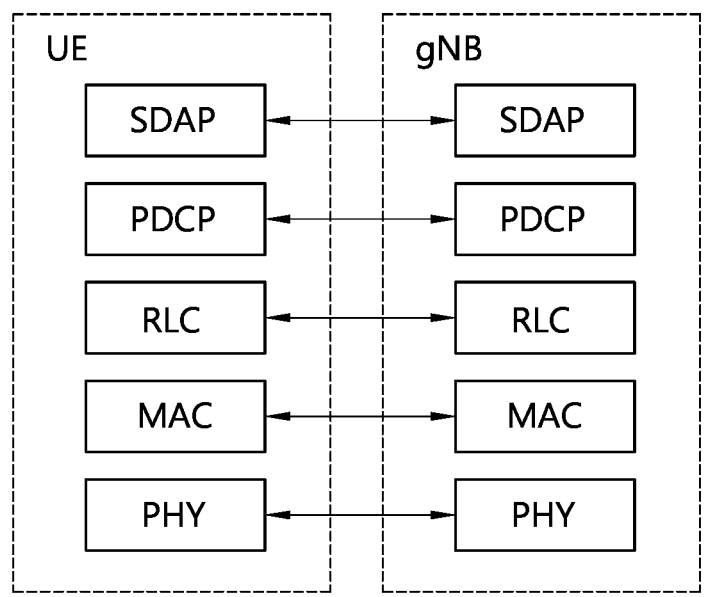
FIG. 5 shows a block diagram of a user plane protocol stack to which the technical features of the present disclosure can be applied.
Figure 6:
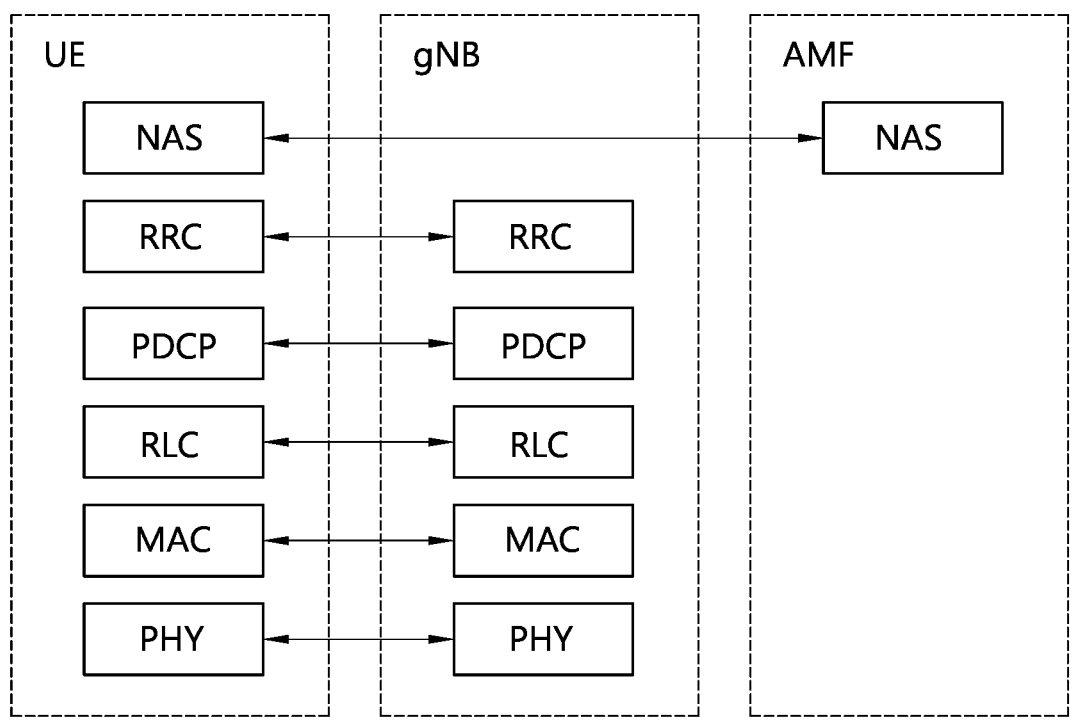
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e., transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e., E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Examples of sidelink communication are described next. These techniques may encompass certain aspects of V2X sidelink communication, but are not limited thereto. Sidelink communication in the scenario of V2X communications (V2X sidelink communication) will be provided further below, following the description of more general sidelink communication.

In some implementations, the examples of sidelink communication described below may be compliant with 3GPP technical standard TS 36.300 V15.2.0 (2018-06), Section 23.10. In some scenarios, sidelink communication generally encompasses a UE to UE interface for sidelink communication, vehicle-to-everything (V2X) sidelink communication and sidelink discovery. In some implementations, the sidelink corresponds to the PC5 interface. Sidelink transmissions may be defined for sidelink discovery, sidelink communication, and V2X sidelink communication between UEs. In some implementations, sidelink transmissions use the same frame structure as the frame structure that is defined for UL and DL when UEs are in network coverage. However, in some scenarios, the sidelink transmission may be restricted to a sub-set of the UL resources in the time and frequency domains. Various physical channels, transport channels, and logical channels may be implemented and utilized for sidelink transmission.

In some implementations, sidelink communication is a mode of communication whereby UEs can communicate with each other directly over the PC5 interface. This communication mode is supported when the UE is served by E-UTRAN and when the UE is outside of E-UTRA coverage. In some scenarios, only those UEs authorized to be used for public safety operation can perform sidelink communication. The terminology "sidelink communication" without "V2X" prefix may, in some scenarios, only concern public safety unless specifically stated otherwise.

In order to perform synchronization for out of coverage operation, the UE(s) may act as a synchronization source by transmitting a sidelink broadcast control channel (SBCCH) and a synchronization signal. In some scenarios, SBCCH carries the most essential system information needed to receive other sidelink channels and signals. In some implementations, SBCCH along with a synchronization signal is transmitted with a fixed periodicity of 40 ms. When the UE is in network coverage, the contents of SBCCH may be derived from the parameters signaled by the BS. When the UE is out of coverage, if the UE selects another UE as a synchronization reference, then the content of SBCCH may be derived from the received SBCCH.

Otherwise, in some implementations, the UE uses pre-configured parameters. For example, system information block type-18 (SIB18) provides the resource information for the synchronization signal and SBCCH transmission. In some scenarios, there are two pre-configured subframes every 40 ms for out of coverage operation. The UE may receive the synchronization signal and SBCCH in one subframe and transmit synchronization signal and SBCCH on another subframe if the UE becomes a synchronization source based on a criterion.

In some implementations, the UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g., modulation and coding scheme (MCS), location of the resource(s) over the duration of SC period, timing alignment).

In some implementations, the UE performs transmission and reception over Uu and PC5 with the following decreasing priority order in case sidelink discovery gap is not configured:

Uu transmission/reception (highest priority);
PC5 sidelink communication transmission/reception;
PC5 sidelink discovery announcement/monitoring (lowest priority).

In some implementations, the UE performs transmission and reception over Uu and PC5 with the following decreasing priority order in case sidelink discovery gap is configured:

Uu transmission/reception for RACH;
PC5 sidelink discovery announcement during a sidelink discovery gap for transmission;
Non-RACH Uu transmission;
PC5 sidelink discovery monitoring during a sidelink discovery gap for reception;
Non-RACH Uu reception;
PC5 sidelink communication transmission/reception.

A UE supporting sidelink communication may, in some implementations, operate in two modes for resource allocation. The first mode is a scheduled resource allocation mode, which may be referred to as "Mode 1" for resource allocation of sidelink communication. In Mode 1, the UE needs to be RRC_CONNECTED in order to transmit data. The UE requests transmission resources from a base station (BS) and the BS schedules transmission resources for transmission of sidelink control information and sidelink data. The UE sends a scheduling request (e.g., a dedicated scheduling request (D-SR) or random access) to the BS followed by a sidelink buffer status report (BSR). Based on the sidelink BSR, the BS may determine that the UE has data for a sidelink communication transmission, and may estimate the resources needed for transmission. The BS may then schedule transmission resources for sidelink communication using a configured sidelink radio network temporary identity (SL-RNTI). Therefore, in such scenarios, a UE that is in the RRC_CONNECTED state and that is to perform a sidelink communication may send a sidelink UE information message to a BS. In response, the BS may configure the UE with a SL-RNTI.

The second mode of resource allocation for sidelink communication is a UE autonomous resource selection mode, which may be referred to as "Mode 2" for resource allocation of sidelink communication. In Mode 2, a UE selects resources from one or more resource pools and performs selection of a transport format to transmit sidelink control information and data. In some scenarios, there may be up to 8 transmission resource pools either pre-configured for out of coverage operation or provided by RRC signaling for in-coverage operation. Each resource pool may have one or more priority levels (e.g., one or more ProSe per-packet priority (PPPP)) associated with it. As an example, for transmission of a MAC PDU, the UE selects a transmission pool in which one of the associated PPPP is equal to the PPPP of a logical channel with highest PPPP among the logical channel identified in the MAC PDU. In some implementations, it is up to UE implementation how the UE selects amongst multiple pools with same associated PPPP. There is a one to one association between sidelink control pool and sidelink data pool. Once the resource pool is selected, in some scenarios, the selection is valid for an entire sidelink control (SC) period. After the SC period is finished, the UE may perform resource pool selection again. The UE is allowed to perform multiple transmissions to different destinations in a single SC period.

Having provided various examples of general sidelink communication above, next, some examples of sidelink communication in the scenario of V2X communications (V2X sidelink communication) are described.

In some implementations, the techniques of V2X sidelink communication described below may be compliant with technical standard 3GPP TS 36.300 V15.2.0 (2018-06), e.g., Section 23.14. In general, V2X services may consist of various types, such as vehicle-to-vehicle (V2V) services, vehicle-to-infrastructure (V2I) services, vehicle-to-nomadic (V2N) services, and vehicle-to-pedestrian (V2P) services.

V2X services may be provided by PC5 interface and/or Uu interface, according to some implementations. Support of V2X services via PC5 interface is provided by V2X sidelink communication, which is a mode of communication whereby UEs communicate with each other directly over the PC5 interface. This communication mode is supported when the UE is served by E-UTRAN and when the UE is outside of E-UTRA coverage. In some implementations, only UEs that are authorized for V2X services may perform V2X sidelink communication.

V2X sidelink communication may implement and utilize a user plane protocol stack and functions for sidelink communication. In addition, according to some implementations of V2X sidelink communication:

Sidelink traffic channel (STCH) for sidelink communication is also used for V2X sidelink communication.
Non-V2X (e.g., public safety related) data is not multiplexed with V2X data transmitted in resources configured for V2X sidelink communication.
The access stratum (AS) is provided with the PPPP and ProSe per-packet reliability (PPPR) of a protocol data unit transmitted over PC5 interface by higher layers. The packet delay budget (PDB) of the protocol data unit can be determined from the PPPP. The low PDB is mapped to the high priority PPPP value.
The AS is provided with a transmit profile of a protocol data unit transmitted over PC5 interface by upper layers.
The logical channel prioritization based on PPPP is used for V2X sidelink communication.
Control plane protocol stack for SBCCH for sidelink communication is also used for V2X sidelink communication.

A UE supporting V2X sidelink communication may, in some implementations, operate in two modes for resource allocation. The first mode is a scheduled resource allocation, which may be referred to as "Mode 3" for resource allocation of V2X sidelink communication. In Mode 3, the UE needs to be RRC_CONNECTED in order to transmit data. The UE requests transmission resources from a BS, and the BS schedules transmission resources for transmission of sidelink control information and data. Sidelink semi-persistent scheduling (SPS) is supported for the Mode 3.

The second mode of resource allocation for V2X sidelink communication is a UE autonomous resource selection, which may be referred to as "Mode 4" for resource allocation of V2X sidelink communication. In Mode 4, the UE selects resources from one or more resource pools and performs selection of transport format to transmit sidelink control information and data. In scenarios where mapping between the zones and V2X sidelink transmission resource pools is configured, the UE selects a V2X sidelink resource pool based on the zone in which the UE is located. The UE may perform sensing for selection (or re-selection) of sidelink resources. Based on the sensing results, the UE may select (or re-select) specific sidelink resources and may reserve multiple sidelink resources. In some scenarios, up to 2 parallel independent resource reservation processes are allowed to be performed by the UE. The UE is also allowed to perform a single resource selection for its V2X sidelink transmission.

An RRC_CONNECTED UE may send a sidelink UE information message to the serving cell if it is interested in V2X sidelink communication transmission in order to request sidelink resources.

For sidelink SPS, maximum 8 SPS configurations with different parameters can be configured by eNB and all SPS configurations can be active at the same time. The activation/deactivation of SPS configuration is signaled via PDCCH by eNB. The existing logical channel prioritization based on PPPP is used for sidelink SPS.

UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the system frame number (SFN) 0, PPPP, PPPR, destination Layer-2 ID, and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

Sidelink UE information is described. Section 5.10.2 of 3GPP TS 36.331 V15.3.0 (2018-06) can be referred.

Figure 7:
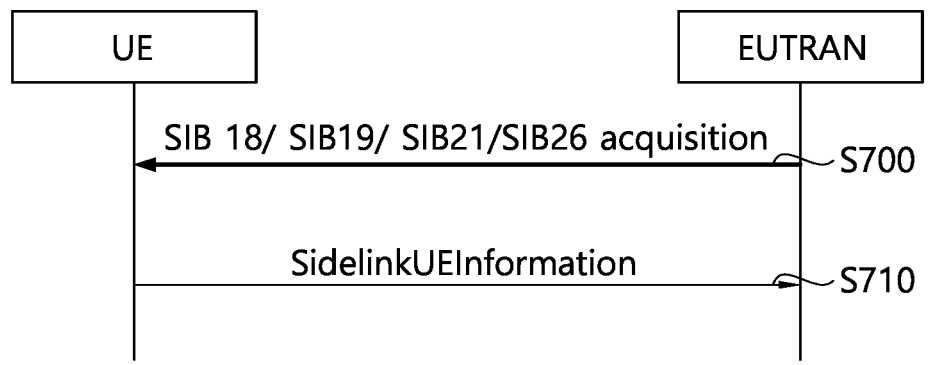
FIG. 7 shows an example of sidelink UE information procedure to which the technical features of the present disclosure can be applied.

FIG. 7 shows an example of sidelink UE information procedure to which the technical features of the present disclosure can be applied.

In step S700, the UE acquires at least one of SIB 18, SIB 19, SIB 21 and/or SIB 26 from the network. In step S710, the UE transmits Sidelink UE information message (SidelinkUEInformation message) to the network.

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

Specifically, a UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a primary cell (PCell) broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

Table 3 shows an example of sidelink UE information message.

TABLE 3

| | |
|---|---|
| -- ASN1START | |
| SidelinkUEInformation-r12 ::= | SEQUENCE { |
|   criticalExtensions | CHOICE { |
|     c1 | CHOICE |
|   { | |
|       sidelinkUEInformation-r12 | SidelinkUEInformation-r12-IEs, |
|       spare3 NULL, spare2 NULL, spare1 NULL | |
|     }, | |
|     criticalExtensionsFuture | SEQUENCE { } |
|   } | |
| } | |
| SidelinkUEInformation-r12-IEs ::= | SEQUENCE { |
|   commRxInterestedFreq-r12 | ARFCN-ValueEUTRA-r9 |
|   OPTIONAL, | |
|   commTxResourceReq-r12 | SL-CommTxResourceReq-r12 |
|   OPTIONAL, | |
|   discRxInterest-r12 | ENUMERATED {true} |
|   OPTIONAL, | |
|   discTxResourceReq-r12 | INTEGER (1..63) |
|   OPTIONAL, | |
|   lateNonCriticalExtension | OCTET STRING |
|   OPTIONAL, | |
|   nonCriticalExtension | SidelinkUEInformation-v1310-IEs |
|   OPTIONAL | |
| } | |
| SidelinkUEInformation-v1310-IEs ::= | SEQUENCE { |

TABLE 3-continued

```
  commTxResourceReqUC-r13           SL-CommTxResourceReq-r12
    OPTIONAL,
  commTxResourceInfoReqRelay-r13    SEQUENCE {
    commTxResourceReqRelay-r13        SL-CommTxResourceReq-r12
    OPTIONAL,
    commTxResourceReqRelayUC-r13      SL-CommTxResourceReq-r12
    OPTIONAL,
    ue-Type-r13                       ENUMERATED
{relayUE, remoteUE}
  }
                                    OPTIONAL,
  discTxResourceReq-v1310           SEQUENCE {
    carrierFreqDiscTx-r13             INTEGER (1..maxFreq)
    OPTIONAL,
    discTxResourceReqAddFreq-r13    SL-DiscTxResourceReqPerFreqList-r13
    OPTIONAL
  }
                                    OPTIONAL,
  discTxResourceReqPS-r13           SL-DiscTxResourceReq-r13
    OPTIONAL,
  discRxGapReq-r13                  SL-GapRequest-r13
    OPTIONAL,
  discTxGapReq-r13                  SL-GapRequest-r13
    OPTIONAL,
  discSysInfoReportFreqList-r13     SL-DiscSysInfoReportFreqList-r13
    OPTIONAL,
  nonCriticalExtension              SidelinkUEInformation-v1430-IEs
        OPTIONAL
}
SidelinkUEInformation-v1430-IEs ::= SEQUENCE {
  v2x-CommRxInterestedFreqList-r14  SL-V2X-CommFreqList-r14
    OPTIONAL,
  p2x-CommTxType-r14                ENUMERATED {true}
    OPTIONAL,
  v2x-CommTxResourceReq-r14         SL-V2X-CommTxFreqList-r14
    OPTIONAL,
  nonCriticalExtension              SidelinkUEInformation-v1530-IEs
                                      OPTIONAL
}
SidelinkUEInformation-v1530-IEs ::= SEQUENCE {
  reliabilityInfoListSL-r15         SL-ReliabilityList-r15
    OPTIONAL,
  nonCriticalExtension              SEQUENCE { }
        OPTIONAL
}
SL-CommTxResourceReq-r12 ::=        SEQUENCE {
  carrierFreq-r12                     ARFCN-ValueEUTRA-r9
    OPTIONAL,
  destinationInfoList-r12             SL-DestinationInfoList-r12
}
SL-DiscTxResourceReqPerFreqList-r13 ::= SEQUENCE (SIZE (1..maxFreq)) OF SL-
DiscTxResourceReq-r13
SL-DiscTxResourceReq-r13 ::=        SEQUENCE {
  carrierFreqDiscTx-r13               INTEGER (1..maxFreq)
    OPTIONAL,
  discTxResourceReq-r13               INTEGER (1..63)
}
SL-DestinationInfoList-r12 ::= SEQUENCE (SIZE (1..maxSL-Dest-r12)) OF SL-
DestinationIdentity-r12
SL-DestinationIdentity-r12 ::= BIT STRING (SIZE (24))
SL-DiscSysInfoReportFreqList-r13 ::= SEQUENCE (SIZE (1.. maxSL-
DiscSysInfoReportFreq-r13)) OF SL-DiscSysInfoReport-r13
SL-V2X-CommFreqList-r14 ::= SEQUENCE (SIZE (1..maxFreqV2X-r14)) OF INTEGER
(0..maxFreqV2X-1-r14)
SL-V2X-CommTxFreqList-r14 ::=       SEQUENCE (SIZE (1..maxFreqV2X-r14)) OF SL-
V2X-CommTxResourceReq-r14
*204
SL-V2X-CommTxResourceReq-r14 ::=    SEQUENCE {
  carrierFreqCommTx-r14               INTEGER (0.. maxFreqV2X-1-r14)
    OPTIONAL,
  v2x-TypeTxSync-r14                  SL-TypeTxSync-r14
    OPTIONAL,
  v2x-DestinationInfoList-r14         SL-DestinationInfoList-r12
    OPTIONAL
}
-- ASN1STOP
```

Table 4 shows an example of UE assistance information message (UEAssistanceInformation message). The UEAssistanceInformation message is used for the indication of UE assistance information to the eNB.

TABLE 4

```
-- ASN1START
UEAssistanceInformation-r11 ::=                 SEQUENCE {
    criticalExtensions                          CHOICE {
        c1
        CHOICE {
                                                ueAssistanceInformation-r11
UEAssistanceInformation-r11-IEs,
                                                spare3 NULL, spare2 NULL, spare1 NULL
        },
        criticalExtensionsFuture                SEQUENCE { }
    }
}
UEAssistanceInformation-r11-IEs ::=             SEQUENCE {
    powerPrefIndication-r11                     ENUMERATED {normal,
lowPowerConsumption}OPTIONAL,
    lateNonCriticalExtension                    OCTET STRING
                                                OPTIONAL,
    nonCriticalExtension                        UEAssistanceInformation-v1430-
IEs                                             OPTIONAL
}
UEAssistanceInformation-v1430-IEs ::=           SEQUENCE    {
    bw-Preference-r14                                       BW-Preference-r14
                                                            OPTIONAL,
    sps-AssistanceInformation-r14               SEQUENCE {
        trafficPatternInfoListSL-r14                TrafficPatternInfoList-r14
OPTIONAL,
        trafficPatternInfoListUL-r14                TrafficPatternInfoList-r14
OPTIONAL
    }                                           OPTIONAL,
    rlm-Report-r14                                          SEQUENCE {
        rlm-Event-r14                                       ENUMERATED
{earlyOutOfSync, earlyInSync},
        excessRep-MPDCCH-r14                    OPTIONAL    ENUMERATED
{excessRep1, excessRep2}
    }
    OPTIONAL,                                   delayBudgetReport-r14
    DelayBudgetReport-r14                                   OPTIONAL,
    nonCriticalExtension                        UEAssistanceInformation-v1450-
IEs                                             OPTIONAL
}
UEAssistanceInformation-v1450-IEs ::=           SEQUENCE {
    overheatingAssistance-r14                               OverheatingAssistance-
r14                                             OPTIONAL,
    nonCriticalExtension                                    UEAssistanceInformation-
v1530-IEs                                       OPTIONAL
}
UEAssistanceInformation-v1530-IEs ::= SEQUENCE {
    sps-AssistanceInformation-v1530                         SEQUENCE {
        trafficPatternInfoListSL-v1530                      TrafficPatternInfoList-
v1530
    }                                           OPTIONAL,
    nonCriticalExtension                                    SEQUENCE { }
                                                OPTIONAL
}
BW-Preference-r14 ::= SEQUENCE {
    dl-Preference-r14                           ENUMERATED  {mhz1dot4, mhz5,
mhz20 }                                                     OPTIONAL,
    ul-Preference-r14                           ENUMERATED  {mhz1dot4, mhz5}
                                                OPTIONAL
}
TrafficPatternInfoList-r14 ::= SEQUENCE (SIZE (1..maxTrafficPattern-r14)) OF
TrafficPatternInfo-r14
TrafficPatternInfo-r14 ::=                  SEQUENCE {
    trafficPeriodicity-r14                      ENUMERATED {
sf20, sf50, sf100, sf200, sf300, sf400, sf500,
sf600, sf700, sf800, sf900, sf1000},
    timingOffset-r14                                        INTEGER (0..10239),
    priorityInfoSL-r14                                      SL-Priority-r13
                                                OPTIONAL,
    logicalChannelIdentityUL-r14                INTEGER (3..10)
                                                OPTIONAL,
    messageSize-r14                                         BIT STRING (SIZE (6))
}
TrafficPatternInfoList-v1530 ::= SEQUENCE (SIZE (1..maxTrafficPattern-r14)) OF
TrafficPatternInfo-v1530
TrafficPatternInfo-v1530 ::=                SEQUENCE {
    trafficDestination-r15                              SL-DestinationIdentity-r12
                                                OPTIONAL,
    reliabilityInfoSL-r15                               SL-Reliability-r15
                                                OPTIONAL
```

TABLE 4-continued

```
}
DelayBudgetReport-r14::=           CHOICE {
   type1                           ENUMERATED {
     msMinus1280, msMinus640, msMinus320, msMinus160,
     msMinus80, msMinus60, msMinus40, msMinus20, ms0, ms20,
                                                  ms40, ms60,
ms80, ms160, ms320, ms640, ms1280},
   type2                           ENUMERATED {
     msMinus192, msMinus168,msMinus144, msMinus120,
     msMinus96, msMinus72, msMinus48, msMinus24, ms0, ms24,
                                                  ms48, ms72,
ms96, ms120, ms144, ms168, ms192}
}
OverheatingAssistance-r14 ::=      SEQUENCE {
     reducedUE-Category                SEQUENCE {
                                    reducedUE-CategoryDL  INTEGER (0..19),
                                    reducedUE-CategoryUL  INTEGER (0..21)
     }                              OPTIONAL,
     reducedMaxCCs                     SEQUENCE {
                                    reducedCCsDL
INTEGER (0..31),
                                    reducedCCsUL
INTEGER (0..31)
     }                              OPTIONAL
}
-- ASN1STOP
```

NR V2X is described. Section 5 of 3GPP TR 38.885 V0.1.0 (2018-10) can be referred.

In NR V2X sidelink, broadcast, groupcast, and unicast transmissions are supported for all of the in-coverage, out-of-coverage and partial-coverage scenarios.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following information is known to the physical layer:

Unicast: destination ID, and optionally source ID
Groupcast: Destination group ID, and optionally source ID
HARQ process ID For the purpose of Layer 2 analysis, it is assumed that upper layers (i.e. above access stratum) provide the information whether it is a unicast, groupcast, or broadcast transmission for a particular data transfer. For the unicast and groupcast transmission in NR sidelink, the following information is known to Layer 2:

Unicast: destination ID, source ID
Groupcast: destination Group ID, source ID

Discovery procedure and related messages are up to upper layers for the unicast and groupcast transmission, if necessary.

V2X operation scenarios can be categorized into standalone (SA) and multi-RAT dual connectivity (MR-DC) scenarios regarding the architecture.

Figure 8:
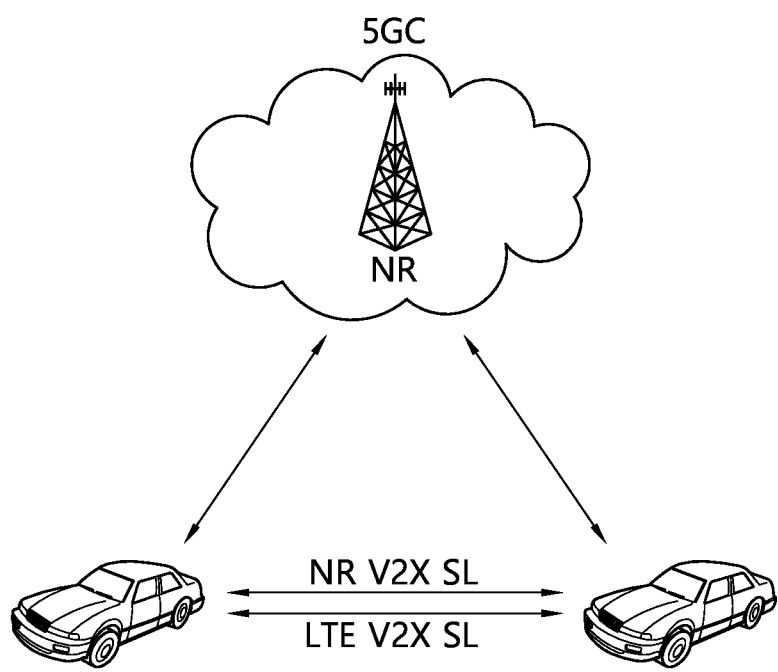
FIG. 8 shows an example of SA scenario to support V2X sidelink communication.

FIG. 8 shows an example of SA scenario to support V2X sidelink communication.

Referring to FIG. 8, a gNB provides control/configuration for a UE's V2X communication in both LTE SL and NR SL.

Figure 9:
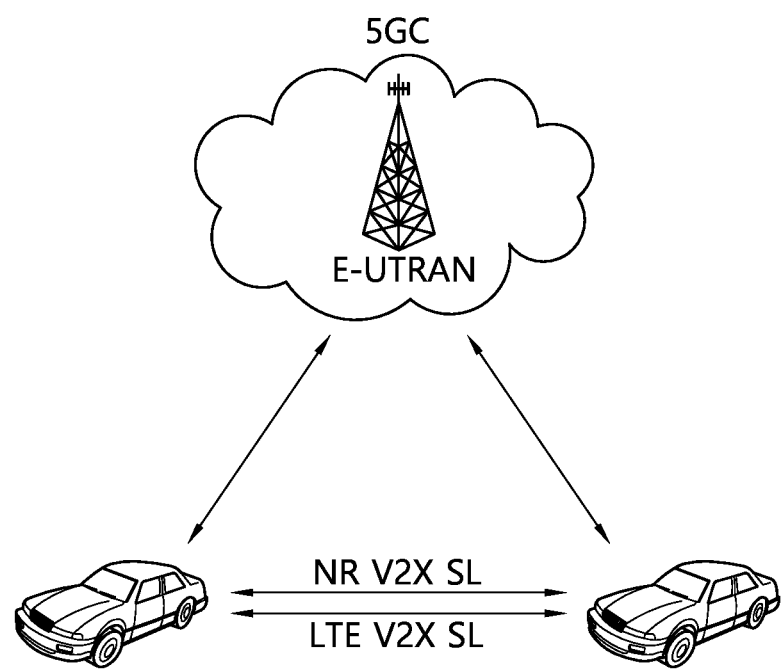
FIG. 9 shows another example of SA scenario to support V2X sidelink communication.

FIG. 9 shows another example of SA scenario to support V2X sidelink communication.

Referring to FIG. 9, an ng-eNB provides control/configuration for a UE's V2X communication in both LTE SL and NR SL.

Figure 10:
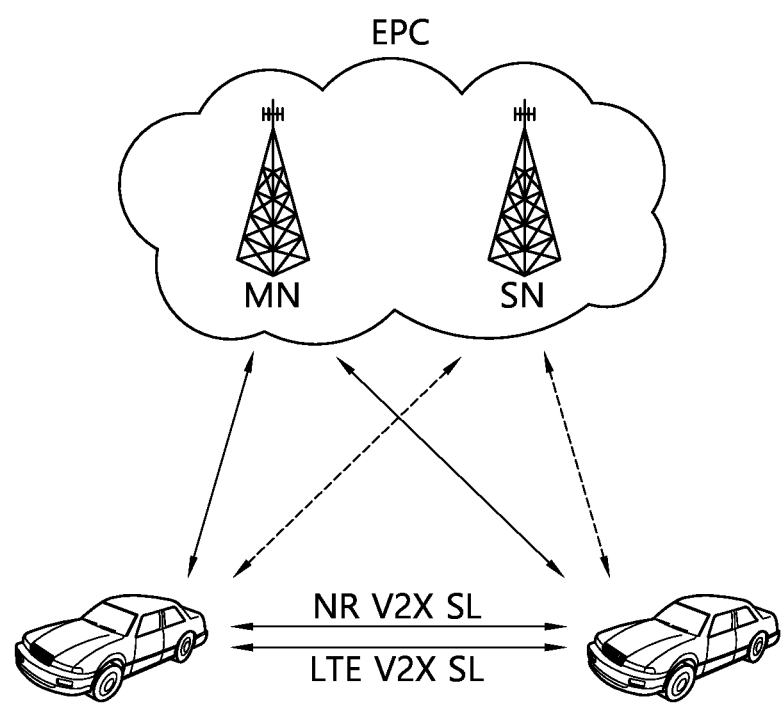
FIG. 10 shows an example of MR-DC scenario to support V2X sidelink communication.

FIG. 10 shows an example of MR-DC scenario to support V2X sidelink communication.

Referring to FIG. 10, a UE's V2X communication in LTE SL and NR SL is controlled/configured by Uu in E-UTRAN NR dual connectivity (EN-DC) scenario.

Figure 11:
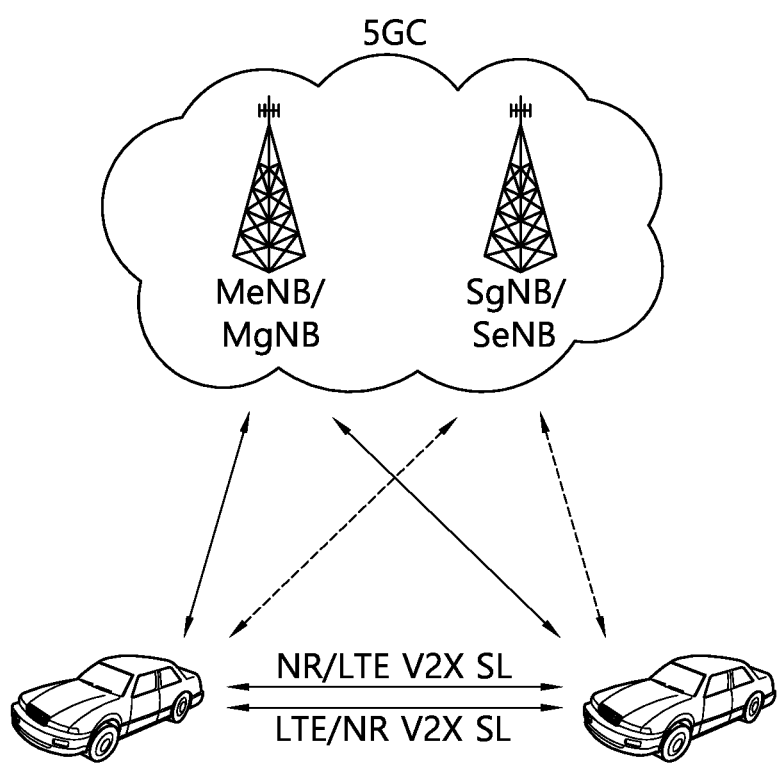
FIG. 11 shows another example of MR-DC scenario to support V2X sidelink communication.

FIG. 11 shows another example of MR-DC scenario to support V2X sidelink communication.

Referring to FIG. 11, a UE's V2X communication in LTE SL and NR SL is controlled/configured by Uu in NG-RAN E-UTRA-NR dual connectivity (NGEN-DC) or NR-E-UTRA dual connectivity (NE-DC) with 5GC scenario.

The network may indirectly allocate sidelink grants to other UEs via one UE. The sidelink grants may be related to SPS. That is, the sidelink grants may be configured grants for SPS (simply as SPS configured grants). In this case, it is unclear when those UEs should deactivate the SPS configured grants.

Figure 12:
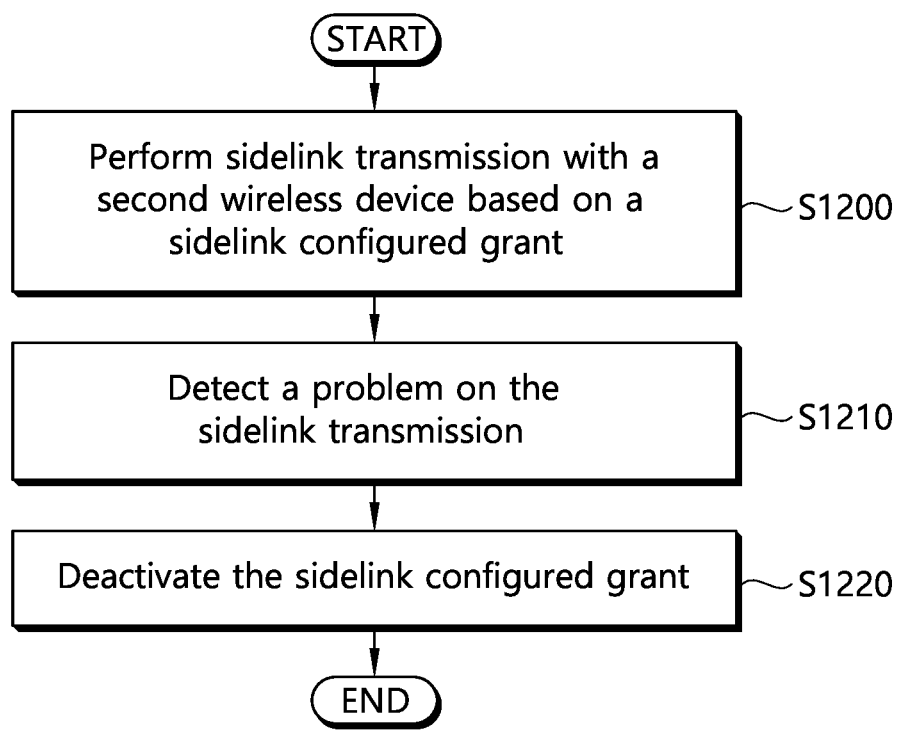
FIG. 12 shows an example of a method for deactivation of a configured grant upon detection of sidelink failure according to an embodiment of the present disclosure.

FIG. 12 shows an example of a method for deactivation of a configured grant upon detection of sidelink failure according to an embodiment of the present disclosure.

In step S1200, the first wireless device performs a sidelink transmission with a second wireless device based on a sidelink configured grant. The first wireless device may perform a sidelink transmission with a second wireless device via the sidelink configured grant. The first wireless device may perform sidelink transmissions with one or more other wireless devices including the second wireless device via the sidelink configured grant. The first wireless device may be in communication with at least one of a mobile device, a network, and/or autonomous vehicles other than the first wireless device.

A group of two or more wireless devices including at least one of the first wireless device and/or the second wireless device may perform sidelink transmissions via the sidelink configured grant.

The sidelink configured grant may be configured or allocated by a network or the first wireless device. The sidelink configured grant may be related to a group including at least one of the first wireless device and/or the second wireless device. The sidelink configured grant may be activated.

In step S1210, the first wireless device detects a problem on the sidelink transmission. The problem on the sidelink transmission may be detected by receiving a problem indication from the second wireless device. Alternatively, the problem on the sidelink transmission may be detected by a failure of detecting signals from the second wireless device.

In step S1220, the first wireless device deactivates the sidelink configured grant. That is, when the first wireless device detects a problem on the sidelink transmission by receiving the problem indication from the second wireless device and/or by the failure of detecting signals from the second wireless device, the first wireless device may deactivate the sidelink configured grant that the first wireless device uses for sidelink transmission to the second wireless device.

More generally, when one of wireless devices in the group fails to detect sidelink signals from other wireless device(s) in the group, the wireless device may deactivate the sidelink configured grant that the wireless device uses for sidelink transmissions to the other wireless device(s) in the group.

Upon deactivating the sidelink configured grant, the first wireless device may autonomously select sidelink resources from a pool of resources. The pool of resources may be received from a network via system information or may be pre-configured.

Upon deactivating the sidelink configured grant, the first wireless device may transmit information related to a deactivation of the sidelink configured grant to a network.

When the second wireless device deactivates the configured sidelink grant, the first wireless device may receive information related to a deactivation of the sidelink configured grant from the second wireless device and forward the information to a network.

The information related to a deactivation of the sidelink configured grant may inform an index of the sidelink configured grant.

Upon transmitting information related to a deactivation of the sidelink configured grant to the network, the first wireless device may receive a reconfiguration message informing release of the sidelink configured grant.

Upon deactivating the sidelink configured grant, if the second wireless device is RRC_IDLE or RRC_INACTIVE, the second wireless device may initiate RRC connection establishment procedure and/or RRC connection resume procedure by performing random access with the network for sidelink communication with the first wireless device.

Figure 13:
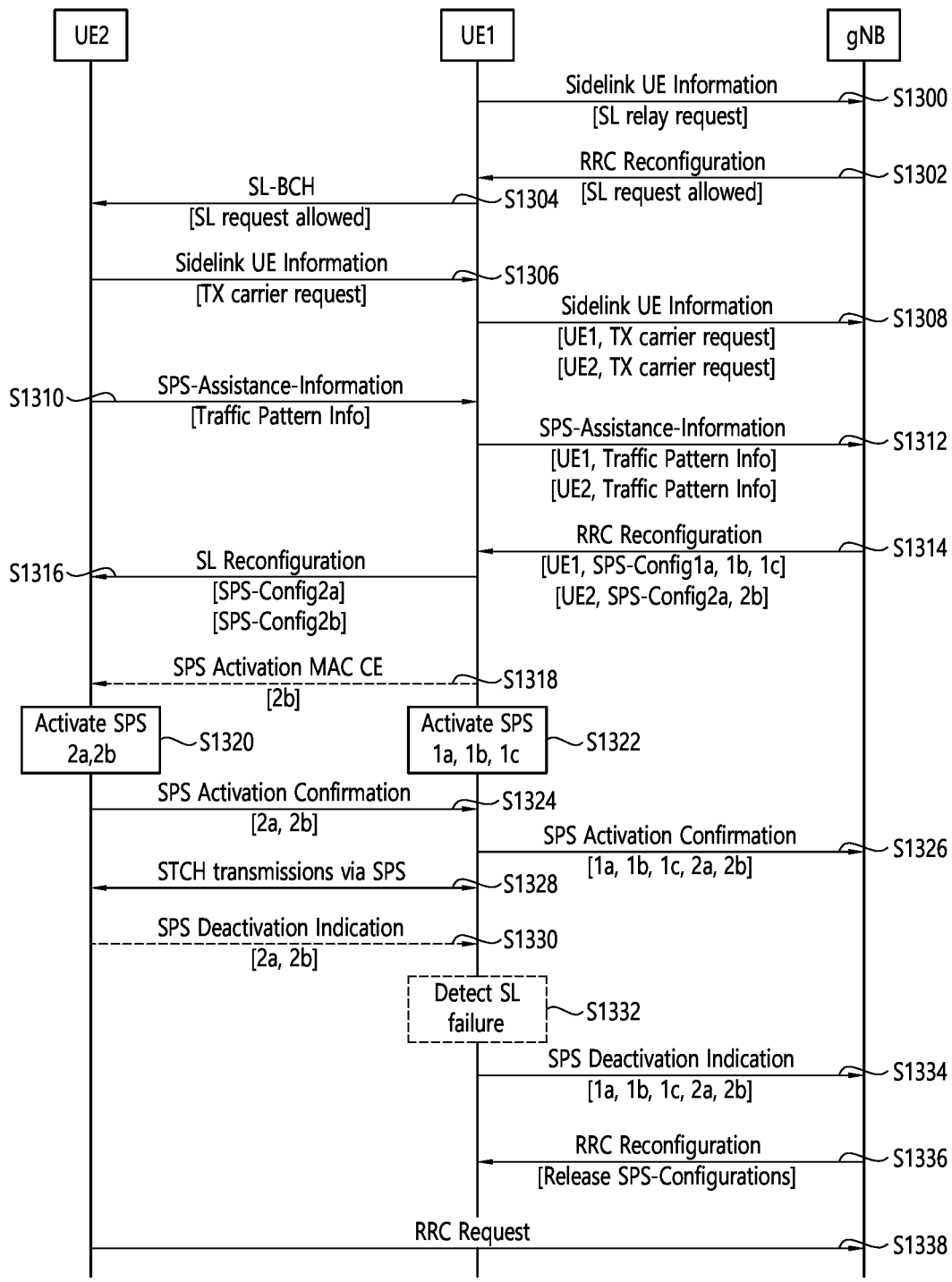
FIG. 13 shows another example of a method for deactivation of a configured grant upon detection of sidelink failure according to an embodiment of the present disclosure.

FIG. 13 shows another example of a method for deactivation of a configured grant upon detection of sidelink failure according to an embodiment of the present disclosure.

In FIG. 13, UE1/UE2 are exemplarily described, but may be replaced with more general devices, e.g., wireless device 1/wireless device 2. Furthermore, gNB is exemplarily described, but may be replaced with more general entity, e.g., base station.

In step S1300, when the UE1 is in RRC_CONNECTED, the UE1 transmits the first sidelink UE information message to request allowance of relaying sidelink control information to the gNB.

Upon receiving the first sidelink UE information message from the UE1, the gNB determines whether the UE1 is allowed to relay sidelink control information from/to the other UE(s) to/from the network, based on information received from the core network node, such as AMF.

If allowed, in step S1302, the gNB indicates to the UE1 that relaying sidelink control information is allowed e.g. via RRC reconfiguration message.

In step S1304, upon receiving the indication from the gNB, the UE1 broadcasts sidelink system information indicating that relaying sidelink control information is allowed via SL-BCH. When the UE2 is RRC_IDLE or RRC_INACTIVE or RRC_CONNECTED, the UE2 receives the sidelink system information from the UE1.

In step S1306, if the UE2 wants to communicate with the UE1 via sidelink, the UE2 sends the second sidelink UE information message including TX sidelink resource request to the UE1. For sending the second sidelink UE information message to the UE1, the UE2 may perform sidelink mode 2 transmissions (i.e., autonomous resource selection) via a resource pool acquired from a network via system information or pre-configuration. In sidelink mode 2, the UE2 autonomously selects sidelink resources from the resource pool.

Upon receiving the second sidelink UE information message from the UE2 and possibly from other UE(s), the UE1 constructs the third sidelink UE information message to request sidelink TX resources for the UE1 and/or the UE2 and/or possibly for other UE(s). The UE1 may allocate UE identifiers for the UE1 and/or the UE2 and/or possibly for other UE(s).

The third sidelink UE information message may list up TX sidelink resource request constructed for the UE1 with the UE1 identifier and TX sidelink resource request received from the UE2 with the UE2 identifier. For example, the third sidelink UE information message may include the fourth sidelink UE information message constructed for the UE1 with the UE1 identifier and the second sidelink UE information message received from the UE2 with the UE2 identifier.

The UE identifiers may be allocated by the UE1 either with explicit IDs or with the order in the list in the third sidelink UE information message. The UE1 may create the UE identifiers based on UE's source upper layer ID and/or source layer-2 ID.

For example, the UE identifiers may be Sidelink-UE-ID or the order in the SL-TxResourceReqList in the third sidelink UE information. SL-TxResourceReq corresponding to the UE2 may be listed with the UE2 identifier and constructed based on the second sidelink UE information message received from the UE2.

Table 5 shows an example of the third sidelink UE information message.

TABLE 5

| | |
|---|---|
| SL-TxResourceReqList ::= | SEQUENCE (SIZE (1..maxSidelinkUE)) OF SL-TxResourceReq |
| SL-TxResourceReq ::= | SEQUENCE { |
| destinationInfoList-r12 | SL-DestinationInfoList-r12 |
| carrierFreqCommTx-r14 OPTIONAL, | INTEGER (0.. maxFreqV2X-1-r14) |
| v2x-TypeTxSync-r14 OPTIONAL, | SL-TypeTxSync-r14 |
| v2x-DestinationInfoList-r14 | SL-DestinationInfoList-r12 |

TABLE 5-continued

| | | |
|---|---|---|
| | | OPTIONAL |
| Sidelink-UE-ID (0..maxSidelinkUE-1) | INTEGER | OPTIONAL - This ID is allocated by UE1 |
| } | | |

In step S1308, the UE1 transmits the constructed third sidelink UE information message to the gNB.

In step S1310, the UE2 transmits UE2's SPS assistance information to the UE1. The UE2's SPS assistance information may include traffic pattern information constructed based on sidelink user traffic transmitted by the UE2.

Upon receiving the UE2's SPS assistance information from the UE2, the UE1 constructs UE1's SPS assistance information. Then, the UE1 constructs an SPS assistance information message including the UE1's SPS assistance information with the previously allocated UE1 identifier and the UE2's SPS assistance information with the previously allocated UE2 identifier. The UE identifiers can be explicit IDs (e.g., Sidelink-UE-ID) or the order in the TrafficPatternInfoList.

Table 6 shows an example of the SPS assistance information message.

TABLE 6

| | |
|---|---|
| TrafficPatternInfoList ::= | SEQUENCE (SIZE (1..maxTrafficPattern)) OF TrafficPatternInfo |
| TrafficPatternInfo ::= | SEQUENCE { |
| Sidelink-UE-ID (0..maxSidelinkUE-1) | INTEGER OPTIONAL |
| trafficPeriodicity-r14 | ENUMERATED { sf20, sf50, sf100, sf200, sf300, sf400, sf500, sf600, sf700, sf800, sf900, sf1000}, |
| timingOffset-r14 | INTEGER (0..10239), |
| priorityInfoSL-r14 | SL-Priority-r13 OPTIONAL, |
| logicalChannelIdentityUL-r14 | INTEGER (3..10) OPTIONAL, |
| messageSize-r14 | BIT STRING (SIZE (6)) |
| trafficDestination-r15 | SL-DestinationIdentity-r12 OPTIONAL, |
| reliabilityInfoSL-r15 | SL-Reliability-r15 OPTIONAL |
| } | |

In step S1312, the UE1 transmits the constructed SPS assistance information message to the gNB.

In step S1314, upon receiving the SPS assistance information message from the UE1, the gNB sends multiple SPS configurations to the UE1 via RRC reconfiguration message. Each SPS configuration (e.g., SL-SPSConfiguredGrantConfig) may include a SPS configured grant with the UE identifier received from UE1, e.g. Sidelink-UE-ID, and an SPS Index. Since the UE identifier is allocated by the UE1, the gNB may not understand context of a UE mapped to the UE identifier. Different SPS configurations may have different SPS Indices.

Table 7 shows an example of the RRC Reconfiguration message.

TABLE 7

| | |
|---|---|
| SL-SPSConfiguredGrantConfigList ::= | SEQUENCE (SIZE (1.. maxSidelinkUE)) OF SL-SPSConfiguredGrantConfig |
| SL-SPSConfiguredGrantConfig ::= | SEQUENCE { |
| Sidelink-UE-ID (0..maxSidelinkUE-1) | INTEGER OPTIONAL |
| SPS-Index (0..maxSPSIndex-1) | INTEGER OPTIONAL |
| frequencyHopping OPTIONAL, -- Need S, | ENUMERATED {intraSlot, interSlot} |
| cg-DMRS-Configuration | DMRS-UplinkConfig, |
| mcs-Table OPTIONAL, -- Need S | ENUMERATED {qam256, qam64LowSE} |
| mcs-TableTransformPrecoder OPTIONAL, -- Need S | ENUMERATED {qam256, qam64LowSE} |
| uci-OnPUSCH OPTIONAL, -- Need M | SetupRelease { CG-UCI-OnPUSCH } |
| resourceAllocation | ENUMERATED { resourceAllocationType0, resourceAllocationType1, dynamicSwitch }, |

TABLE 7-continued

```
    rbg-Size                              ENUMERATED {config2}
OPTIONAL,    -- Need S
    powerControlLoopToUse                 ENUMERATED {n0, n1},
    p0-PUSCH-Alpha                        P0-PUSCH-AlphaSetId,
    transformPrecoder                     ENUMERATED {enabled, disabled}
OPTIONAL,    -- Need S
    nrofHARQ-Processes                    INTEGER(1..16),
    repK                                  ENUMERATED {n1, n2, n4, n8},
    repK-RV                               ENUMERATED {s1-0231, s2-0303, s3-
0000}                                     OPTIONAL,    -- Need R
    periodicity                           ENUMERATED {
                                              sym2, sym7, sym1x14, sym2x14,
sym4x14, sym5x14, sym8x14, sym10x14, sym16x14, sym20x14,
                                              sym32x14, sym40x14,
sym64x14, sym80x14, sym128x14, sym160x14, sym256x14, sym320x14, sym512x14,
                                              sym640x14, sym1024x14,
sym1280x14, sym2560x14, sym5120x14,
                                              sym6, sym1x12, sym2x12,
sym4x12, sym5x12, sym8x12, sym10x12, sym16x12, sym20x12, sym32x12,
                                              sym40x12, sym64x12,
sym80x12, sym128x12, sym160x12, sym256x12, sym320x12, sym512x12, sym640x12,
                                              sym1280x12, sym2560x12
    },
    configuredGrantTimer                  INTEGER (1..64)
OPTIONAL,    -- Need R
    rrc-ConfiguredSidelinkGrant           SEQUENCE {
        timeDomainOffset                      INTEGER (0..5119),
        timeDomainAllocation                  INTEGER (0..15),
        frequencyDomainAllocation             BIT STRING (SIZE(18)),
        antennaPort                           INTEGER (0..31),
        dmrs-SeqInitialization                INTEGER (0..1)
OPTIONAL,    -- Need R
        precodingAndNumberOfLayers            INTEGER (0..63),
        srs-ResourceIndicator                 INTEGER (0..15)
OPTIONAL,    -- Need R
        mcsAndTBS                             INTEGER (0..31),
        frequencyHoppingOffset                INTEGER (1..
maxNrofPhysicalResourceBlocks-1)          OPTIONAL,    -- Need R
        pathlossReferenceIndex                INTEGER (0..maxNrofPUSCH-
PathlossReferenceRSs-1),
        ...
    }
OPTIONAL,    -- Need R
...
}
```

In this example, it is assumed that SPS configurations 1a, 1b and 1c are configured to the UE1, and SPS configurations 2a and 2B are configured to the UE2.

In step S1316, upon receiving the RRC reconfiguration message from the gNB, the UE1 sends the SPS configurations corresponding to the UE2 identifier (i.e., SPS configurations 2a and 2B) to the UE2, by sending one or more listed SL-SPSConfiguredGrantConfig corresponding to the UE2 identifier with the corresponding SPS-Index(es). The SPS configurations corresponding to the UE2 identifier may be transmitted via the activated SPS configured grant.

In some implementations of the present disclosure, instead of the gNB, the UE1 may alternatively allocate a SPS-Index to each SPS configuration received from the gNB. The UE1 may send UE2's SPS configuration to the UE2 with the corresponding SPS-Index allocated by the UE1.

In step S1318, after sending the SPS configurations corresponding to the UE2 identifier, the UE1 may send SPS activation/deactivation MAC control element (CE) indicating the activation of the SPS configuration corresponding to the SPS index(es) to the UE2. In this example, it is assumed that the SPS activation/deactivation MAC CE indicates activation of the SPS configured grant corresponding to the SPS configuration 2b.

In step S1320, the UE2 activates SPS configured grants corresponding to the SPS configurations 2a and 2b. The UE2 may activate SPS configured grant corresponding to the SPS configurations 2a upon receiving the SPS configuration 2a correspond to the UE2 identifier, i.e., without SPS activation/deactivation MAC CE for the SPS configuration 2a. The UE2 may activate SPS configured grant corresponding to the SPS configurations 2b upon receiving the SPS activation/deactivation MAC CE indicating activation of the SPS configured grant corresponding to the SPS configuration 2b.

Upon activating the SPS configured grants corresponding to the SPS configurations 2a and 2b, the UE2 switches from sidelink mode 2 to sidelink mode 1. In sidelink mode 1, the UE2 uses sidelink grant allocated by the gNB.

In step S1322, the UE1 activates the SPS configured grants corresponding to the UE1 identifier (i.e., SPS configurations 1a, 1b and 1c) e.g., with SL-SPSConfiguredGrantConfig corresponding to the UE1 identifier.

Upon activating the SPS configured grants corresponding to the SPS configurations 1a, 1b and 1c, the UE1 switches from sidelink mode 2 to sidelink mode 1. In sidelink mode 1, the UE1 uses sidelink grant allocated by the gNB.

In step S1324, the UE2 sends a SPS activation/deactivation confirmation MAC CE indicating the corresponding SPS index(es) and activation confirmation to the UE1. The SPS activation/deactivation confirmation MAC CE may indicate confirmation of the activation of the particular SPS configuration grant(s). The SPS activation/deactivation confirmation MAC CE may be transmitted via sidelink mode 2.

In step S1326, the UE1 sends a SPS activation/deactivation confirmation MAC CE indicating the corresponding SPS index(es) and activation confirmation for both the UE1 and UE2 to the gNB.

In step S1328, the UE1 and UE2 transmit sidelink user traffic via the activated SPS configured grants.

In some implementations of the present disclosure, the UE2 may measure sidelink channel quality based on sidelink transmissions from the UE1. If the sidelink channel quality becomes below a threshold indicated by the network or UE1, or sidelink connection failure with the UE1 is detected, e.g., due to N consecutive negative-acknowledgements (NACKs) to sidelink (re-)transmissions, the UE2 may deactivate all UE2's SPS configured grant(s) (i.e., SPS configuration 2a and 2b) and switch to sidelink mode 2.

In step S1330, upon deactivating the UE2's configured grants, the UE2 may send a SPS activation/deactivation MAC CE indicating the corresponding SPS index(es) and deactivation to the UE1. The SPS activation/deactivation MAC CE may indicate deactivation of the all SPS configuration grant(s) of the UE2. The SPS activation/deactivation MAC CE may be transmitted via sidelink mode 2.

In step S1332, the UE detects sidelink failure. In some implementations of the present disclosure, the UE1 may measure sidelink channel quality based on sidelink transmissions from the UE2. The sidelink channel quality may become below a threshold indicated by the network or pre-configuration, or sidelink connection failure with UE2 may be detected, e.g., due to N consecutive NACKs to sidelink (re-)transmissions.

In some implementations of the present disclosure, upon detecting sidelink failure, the UE1 may deactivate all UE1's SPS configured grant(s) (i.e., SPS configuration 1a, 1b and 1c) and switch to sidelink mode 2.

In step S1334, upon deactivating the UE1's configured grants, the UE1 sends SPS deactivation indication to the gNB for indicating deactivation of UE1's SPS configured grant(s) and/or UE2's SPS configured grant(s) to the gNB.

In some implementations of the present disclosure, the UE1 may send a SPS activation/deactivation MAC CE indicating the corresponding SPS index(es) and deactivation to the UE2 via sidelink mode 2.

In step S1336, the UE1 receives a RRC reconfiguration message indicating release of one or more SPS configured grant(s) from the gNB. Then, the UE1 may send a SPS activation/deactivation MAC CE indicating that deactivate UE2's SPS configured grant(s) is released by the gNB to the UE2. Upon receiving the SPS activation/deactivation MAC CE from the UE1, the UE2 may send a SPS activation/deactivation confirmation MAC CE indicating confirmation of release of the SPS configured grant(s) to the UE1.

In step S1338, upon deactivating the SPS configured grants for sidelink communication with the UE1, the UE2 transmits an RRC request message to the gNB.

In some implementations of the present disclosure, if the UE2 is in RRC_IDLE, the UE2 may initiate a RRC connection establishment procedure to the gNB by performing random access for resuming sidelink communication with the UE1 via Uu connection. The UE2 may inform the gNB about UE1's ID such as UE1's source Layer-2 ID or source upper layer ID.

In some implementations of the present disclosure, if the UE2 is in RRC_INACTIVE, the UE2 may initiate a RRC connection resume procedure to the gNB by performing random access for resuming sidelink communication with the UE1 via Uu connection. The UE2 may inform the gNB about UE1's ID such as UE1's source Layer-2 ID or source upper layer ID.

In some implementations of the present disclosure, if the UE2 is in RRC_CONNECTED, the UE2 may inform the gNB about UE1's ID such as UE1's source Layer-2 ID or source upper layer ID for resuming sidelink communication with the UE1 via Uu connection.

Figure 14:
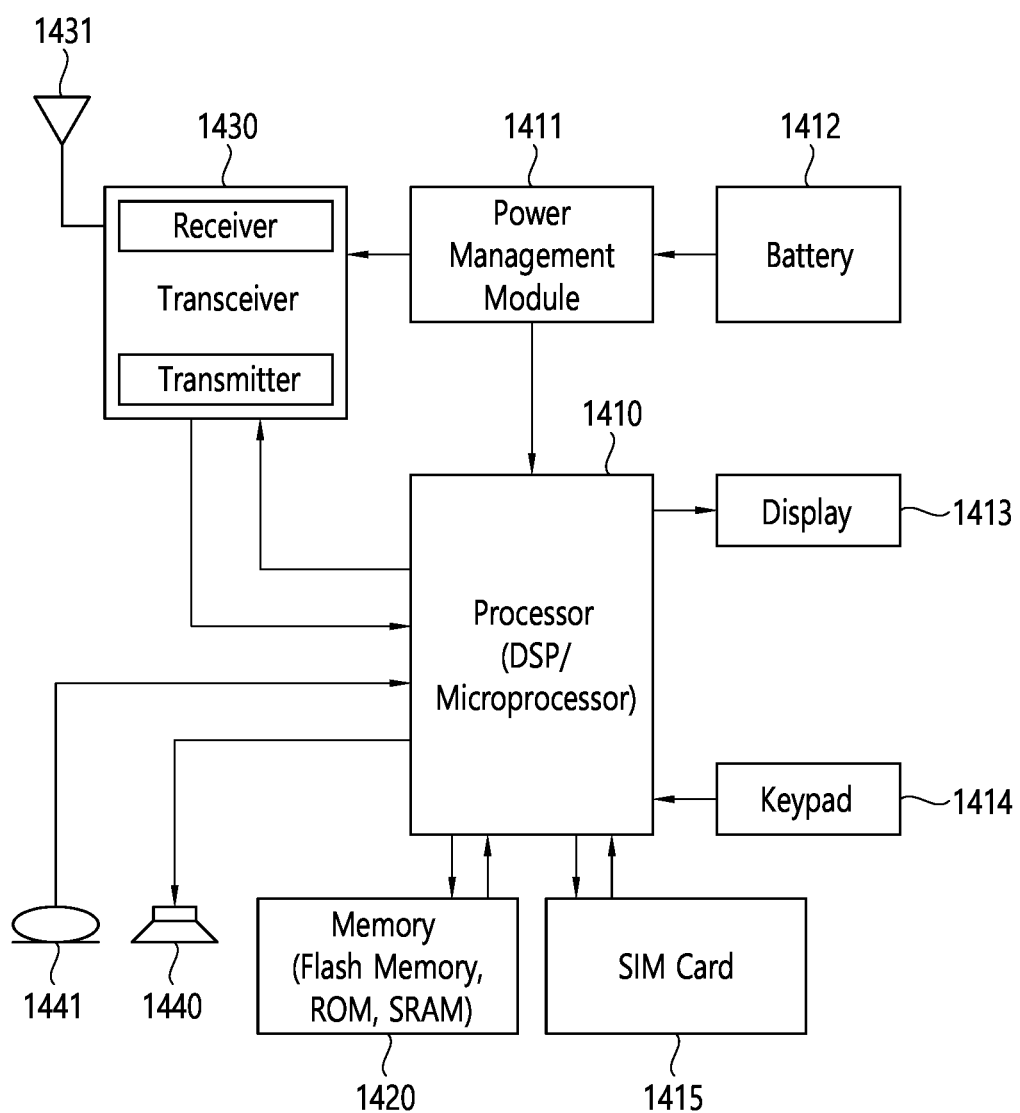
FIG. 14 shows a UE to which the technical features of the present disclosure can be applied.

FIG. 14 shows a UE to which the technical features of the present disclosure can be applied.

A UE includes a processor 1410, a power management module 1411, a battery 1412, a display 1413, a keypad 1414, a subscriber identification module (SIM) card 1415, a memory 1420, a transceiver 1430, one or more antennas 1431, a speaker 1440, and a microphone 1441.

The processor 1410 may be configured to implement proposed functions, procedures and/or methods described in this description. Layers of the radio interface protocol may be implemented in the processor 1410. The processor 1410 may include application-specific integrated circuit (ASIC), other chipset, logic circuit and/or data processing device. The processor 1410 may be an application processor (AP). The processor 1410 may include at least one of a digital signal processor (DSP), a central processing unit (CPU), a graphics processing unit (GPU), a modem (modulator and demodulator). An example of the processor 1410 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1410 may be configured to perform the steps described in FIG. 12 (i.e., steps S1200 to S1220) and/or FIG. 13 (i.e., steps S1300 to S1338). Alternatively, the processor 1410 may be configured to control the memory 1420 and/or the transceiver 1430 to perform the steps described in FIG. 12 (i.e., steps S1200 to S1220) and/or FIG. 13 (i.e., steps S1300 to S1338).

The power management module 1411 manages power for the processor 1410 and/or the transceiver 1430. The battery 1412 supplies power to the power management module 1411. The display 1413 outputs results processed by the processor 1410. The keypad 1414 receives inputs to be used by the processor 1410. The keypad 1414 may be shown on the display 1413. The SIM card 1415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1420 is operatively coupled with the processor 1410 and stores a variety of information to operate the processor 1410. The memory 1420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1420 and executed by the processor 1410. The memory 1420 can be implemented within the processor 1410 or external to the processor 1410 in which case those can be communicatively coupled to the processor 1410 via various means as is known in the art.

The transceiver 1430 is operatively coupled with the processor 1410, and transmits and/or receives a radio signal. The transceiver 1430 includes a transmitter and a receiver. The transceiver 1430 may include baseband circuitry to process radio frequency signals. The transceiver 1430 controls the one or more antennas 1431 to transmit and/or receive a radio signal.

The speaker 1440 outputs sound-related results processed by the processor 1410. The microphone 1441 receives sound-related inputs to be used by the processor 1410.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

Figure 15:
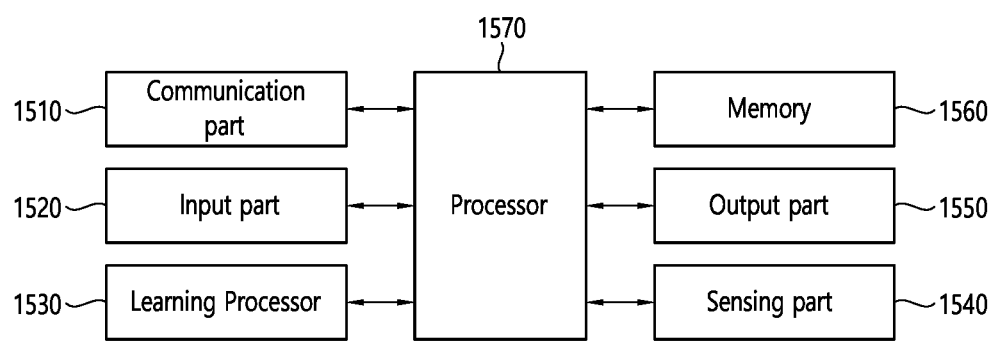
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor 1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
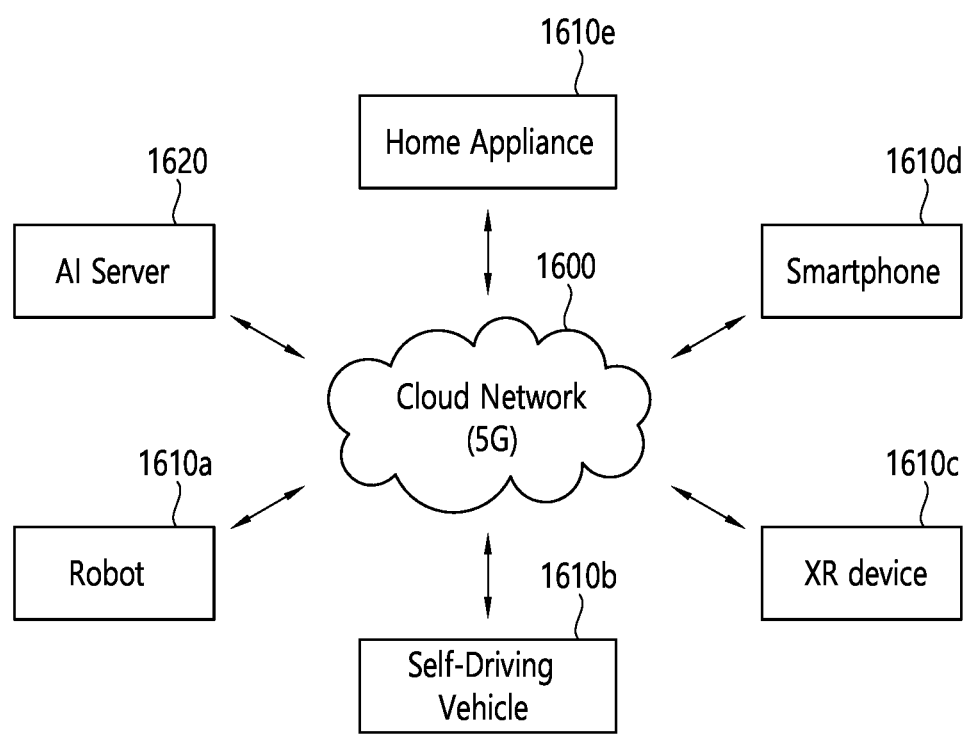
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610a, an autonomous vehicle 1610b, an XR device 1610c, a smartphone 1610d and/or a home appliance 1610e is connected to a cloud network 1600. The robot 1610a, the autonomous vehicle 1610b, the XR device 1610c, the smartphone 1610d, and/or the home appliance 1610e to which the AI technology is applied may be referred to as AI devices 1610a to 1610e.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610a to 1610e and 1620 consisting the AI system may be connected to each other through the cloud network 1600. In particular, each of the devices 1610a to 1610e and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610a, the autonomous vehicle 1610b, the XR device 1610c, the smartphone 1610d and/or the home appliance 1610e through the cloud network 1600, and may assist at least some AI processing of the connected AI devices 1610a to 1610e. The AI server 1620 can learn the ANN according to the machine learning algorithm on behalf of the AI devices 1610a to 1610e, and can directly store the learning models and/or transmit them to the AI devices 1610a to 1610e. The AI server 1620 may receive the input data from the AI devices 1610a to 1610e, infer the result value with respect to the received input data using the learning model, generate a response and/or a control command based on the inferred result value, and transmit the generated data to the AI devices 1610a to 1610e. Alternatively, the AI devices 1610a to 1610e may directly infer a result value for the input data using a learning model, and generate a response and/or a control command based on the inferred result value.

Various embodiments of the AI devices 1610a to 1610e to which the technical features of the present disclosure can be applied will be described. The AI devices 1610a to 1610e shown in FIG. 16 can be seen as specific embodiments of the AI device 1500 shown in FIG. 15.

<AI+Autonomous-Driving/Self-Driving>

The autonomous vehicle 1610b may be implemented as a mobile robot, a vehicle, an unmanned aerial vehicle, etc., to which AI technology is applied. The autonomous vehicle 1610b may include an autonomous driving control module for controlling the autonomous driving function, and the autonomous driving control module may refer to a software module and/or a chip implementing the software module. The autonomous driving control module may be included in the autonomous vehicle 1610b as a component of the autonomous vehicle 1610b, but may be connected to the outside of the autonomous vehicle 1610b with separate hardware. The autonomous vehicle 1610b may acquire the state information of the autonomous vehicle 1610b using the sensor information acquired from various kinds of sensors and/or detect (recognize) the surrounding environment and/or the object, and/or generate map data, and/or determine a travel route and/or a travel plan, and/or determine an operation. Like the robot 1610a, the autonomous vehicle 1610b can use the sensor information acquired from at least one sensor among the LIDAR, the radar, and/or the camera to determine the travel route and/or the travel plan. In particular, the autonomous vehicle 1610b can recognize an environment and/or an object for an area in which the field of view is obscured and/or over a certain distance by receiving sensor information from external devices, and/or receive the recognized information directly from external devices.

The autonomous vehicle 1610b can perform the above-described operations using a learning model composed of at least one ANN. For example, the autonomous vehicle 1610b can recognize the surrounding environment and/or the object using the learning model, and can determine the travel route using the recognized surrounding information and/or the object information. The learning model may be learned directly from the autonomous vehicle 1610b and/or learned from an external device such as the AI server 1620. The autonomous vehicle 1610b can directly generate a result using the learning model and perform an operation. The autonomous vehicle 1610b may transmit sensor information to an external device such as the AI server 1620 and may receive the generated result and perform an operation.

The autonomous vehicle 1610b may determine the travel route and/or the travel plan using at least one of the map data, the object information detected from the sensor information and/or the object information acquired from the external device, and drive the autonomous vehicle 1610b according to the determined travel route and/or travel plan by controlling the driving unit. The map data may include object identification information on various objects arranged in a space (e.g. road) in which the autonomous vehicle 1610b moves. For example, the map data may include object identification information on fixed objects such as street lamps, rocks, and buildings, and/or on movable objects such as vehicles and pedestrians. The object identification information may include a name, a type, a distance, and/or a position, etc. The autonomous vehicle 1610b can perform the operation and/or run by controlling the driving unit based on the control/interaction of the user. The autonomous vehicle 1610b may acquire the intention information of the interaction due to the user's operation and/or voice utterance, determine the response based on the acquired intention information, and perform the operation.

The present disclosure can have various advantageous effects.

For example, sidelink communication can be performed efficiently.

For example, V2X communication can be performed efficiently.

For example, it can be clearly defined when to deactivate a configured grant for sidelink/V2X communication.

For example, a configured grant for sidelink/V2X communication can be handled efficiently when a problem on sidelink is detected.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device adapted to operate in a wireless communication system, the method comprising:
   receiving sidelink system information broadcast by a second wireless device;
   transmitting sidelink user equipment (UE) information to the second wireless device;
   receiving a sidelink configured grant;
   performing a sidelink communication with the second wireless device based on the sidelink configured grant;
   upon detecting a problem on the sidelink communication:
      i) deactivating the sidelink configured grant; and
      ii) transmitting a deactivation indication including an index of the sidelink configured grant to the second wireless device;
   based on the first wireless device being in an idle state, performing a connection establishment procedure with the network;
   based on the first wireless device being in an inactive state, performing a connection resume procedure with the network; and
   informing the network of a source Layer-2 ID of the second wireless device.

2. The method of claim 1, wherein the problem on the sidelink communication is detected by a failure of detecting signals from the second wireless device.

3. The method of claim 1, wherein the sidelink configured grant is configured by the network.

4. The method of claim 1, wherein the sidelink configured grant is configured by the second wireless device.

5. The method of claim 1, wherein the sidelink configured grant is related to a group including the first wireless device and the second wireless device.

6. The method of claim 1, further comprising autonomously selecting sidelink resources from a pool of resources upon deactivating the sidelink configured grant.

7. The method of claim 1, wherein the first wireless device is in communication with at least one of a mobile device, a network, and/or autonomous vehicles other than the first wireless device.

8. A first wireless device adapted to operate in a wireless communication system, the first wireless device comprising:
   a memory;
   a transceiver; and
   a processor, coupled to the memory and the transceiver,
   wherein the first wireless device is configured to perform operations comprising:
      receiving sidelink system information broadcast by a second wireless device;
      transmitting sidelink user equipment (UE) information to the second wireless device;
      receiving a sidelink configured grant;
      perform a sidelink communication with the second wireless device based on the sidelink configured grant;

upon detecting a problem on the sidelink transmission; and:
  i) deactivating the sidelink configured grant; and
  ii) transmitting a deactivation indication including an index of the sidelink configured grant to the second wireless device;
based on the first wireless device being in an idle state, performing a connection establishment procedure with the network;
based on the first wireless device being in an inactive state, performing a connection resume procedure with the network; and
informing the network of a source Layer-2 ID of the second wireless device.

* * * * *